July 31, 1945. S. W. ALDERFER 2,380,372
PORTABLE CONTAINER FOR COMPRESSED GAS
Filed Sept. 28, 1942 2 Sheets-Sheet 1
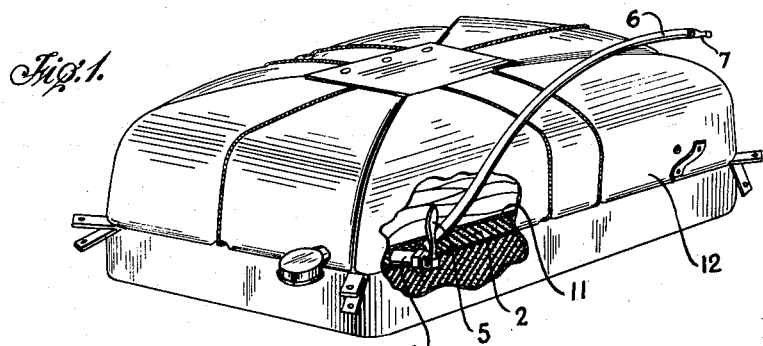
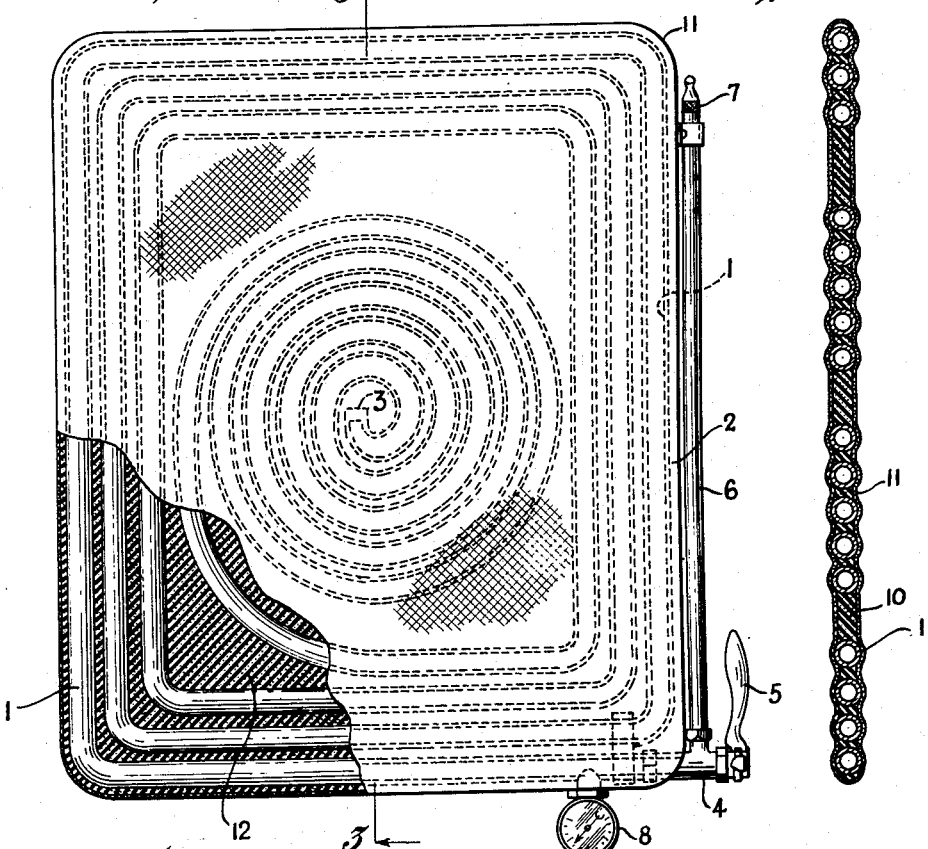
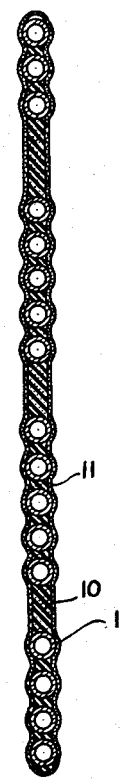
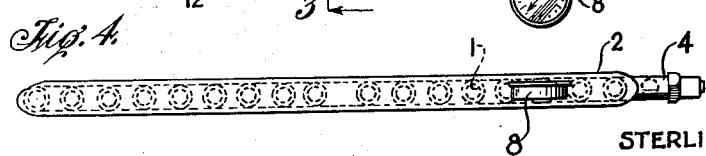
Inventor
STERLING W. ALDERFER July 31, 1945.  S. W. ALDERFER  2,380,372
PORTABLE CONTAINER FOR COMPRESSED GAS
Filed Sept. 28, 1942   2 Sheets-Sheet 2
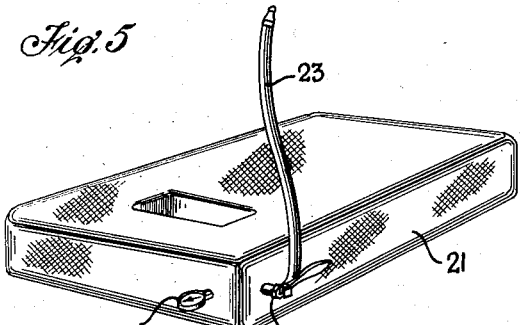
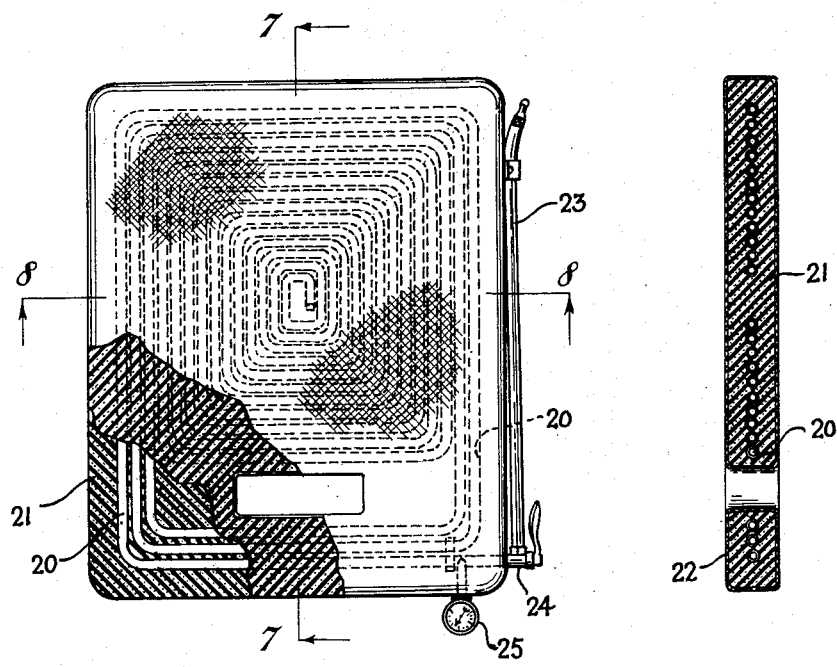
INVENTOR
STERLING W. ALDERFER
BY
ATTORNEYS Patented July 31, 1945

2,380,372

UNITED STATES PATENT OFFICE 2,380,372

PORTABLE CONTAINER FOR COMPRESSED GASES

Sterling W. Alderfer, Akron, Ohio, assignor of one-half to Edward D. Andrews, Akron, Ohio Application September 28, 1942, Serial No. 460,032

2 Claims. (Cl. 244—148)

The present invention is particularly designed and intended for use in connection with parachutes for use in high altitudes where it is necessary to supply the parachutist with a tank of compressed air or oxygen from which he may take sufficient oxygen to sustain him until he reaches lower altitudes. Heretofore the parachutist has been provided with an ordinary bottle of compressed oxygen which is strapped to his leg. This is not only an awkward arrangement, but is quite dangerous as the bottle will explode violently if it is punctured or broken.

It is one purpose of the invention to provide a tank for compressed oxygen, air or other gases which can be built into the seat of the parachute so that it is a part of the parachute pack. It is, therefore, out of the way and does not interfere with the movements of the parachutist. It is also flexible so that it may be incorporated in the seat of the parachute and is readily at hand so that the parachutist does not have to grope for the breather tube or the valve. In addition to these advantages, the tank is in such form that it is not explosive, the arrangement being such that if punctured or broken it will not fly apart due to the sudden release of a large volume of compressed gas as in former types of containers for this purpose.

The invention may also be incorporated in seats or cushions for other purposes, such, for example, as the seats of airplanes. The invention makes it possible to form the tank in any shape so that it may be used in pads adapted for a wide variety of applications. It is possible, for example, to make the container in the form of a pad or shield to be worn on the chest. Nor is the invention restricted to use by aviators, as it may be used wherever it is necessary to supply oxygen or other gases.

While the invention has been shown in two forms, it will be apparent that it may be extended to other uses and other embodiments or forms may be employed with such modifications as may be suggested to apply the invention to various uses and environments.

In the drawings in which the best known or preferred forms of the invention are shown:

Fig. 1 is a view of a complete parachute package incorporating the invention;

Fig. 2 is a plan view of the tank used in the parachute pack;

Fig. 3 is a section on the line 3—3 of Fig. 2;

Fig. 4 is an edge view of the tank;

Fig. 5 shows the invention as it may be embodied in a seat or cushion for more general use;

Fig. 6 is a plan view of Fig. 5; and

Figs. 7 and 8 are sections on the lines 7—7 and 8—8, respectively, of Fig. 6.

The container is made in the form of a long coil of piping, usually of a soft steel or copper, which is furnished in a sufficient length to give an aggregate volume for the storage of sufficient oxygen under pressure to supply ample sustenance for the parachutist. For example, a length of 32 feet of piping of a relatively thin wall construction and approximately $\frac{7}{16}$ inch outer diameter will afford a total volume which will be ample for the purposes. As the pressure on the wall of the pipe at any point is relatively low, it is possible to reduce the thickness of the metal materially and to employ lower grades of metal in the walls and to dispense with the wrappings of wire which are necessary with the old bottle form of tank. In a construction such as illustrated, a steel tubing of approximately .022" wall thickness has been found to be ample to withstand the pressures ordinarily employed. This also eliminates the explosive hazard, for if the pipe is broken or punctured the gas will escape harmlessly.

The pipe 1 is made up in the form of a flat coil, the outer turns of which conform generally to the shape of the seat 2. The inner end of the pipe is closed, as shown at 3, and at its outer end is located the valve 4 operated by the handle 5. To the valve is attached the flexible tubing 6 provided with the mouthpiece 7. The usual pressure indicator is shown at 8. The coil of pipe is embedded in a matrix of soft, flexible material 10, such as sponge rubber or a sponge or cushion made of a rubber-like material or substitute. The tank is covered with a fabric envelope 11 usually of a light, woven fabric. The unit shown in Figs. 2 to 4 may be assembled and vulcanized in one piece.

The method of incorporating the tank in the parachute pack 12 is shown in Fig. 1. As the construction and operation of these packs is well known, no detailed description thereof is necessary. It will be noted, however, that the flat, flexible tank may be incorporated in the seat and as a part of the pack and is, therefore, entirely out of the way. It will also be noted that the location of the tank is very convenient as the valve and tube are right at hand for the parachutist.

Any suitable packing material may be employed in making up the tank and the configuration of the coiled pipe may be altered or modified.

In the modification shown in Figs. 5 to 8 incl., the coil of pipe 20 constituting the container is embedded within a thicker body of cushioning material 21 so that a seat cushion or pad for general utility is formed. The cushion is covered with a fabric jacket 22, and the breather hose 23, valve 24 and pressure indicator 25 may be arranged as shown.

It will be seen that the invention comprises a tank in the form of a flat coil of pipe surrounding and embedded in a spacing and cushioning material. The device is a flexible pad which may be adapted to a wide variety of uses. As the gas under pressure is confined in a long passage of relatively small cross section, the tank may be fractured without danger of scattering pieces of metal, which is a particularly dangerous feature of the ordinary bottle form of tank. The surrounding material not only is useful for its cushioning properties, but also helps to prevent the pieces of metal flying about. It is possible in some applications to dispense with the cushioning material.

Other objects and advantages flow from the use of the invention, it being seen that the invention may be incorporated in many forms and variations within the scope of the appended claims.

What is claimed is:

1. A parachute pack for use at high altitudes, said pack including a cushion portion and a parachute-container portion having a flat side secured to said cushion portion, said cushion portion comprising a mass of cushioning material of such size and shape as to be approximately coextensive with said side of said container, an oxygen storage means positioned within and surrounded by said cushioning material, said oxygen storage means comprising a length of flexible, non-expansible pipe of small diameter, said pipe being spirally coiled in a plane approximately parallel to the said side of said container, one end of said pipe being closed and the other end thereof connected to a valve fitting, said valve fitting extending to the outside of said cushion and adapted to be attached to a breather tube whereby a parachutist at high altitude may be supplied with oxygen.

2. A combined seat cushion and oxygen storage means comprising a mass of cushioning material, and an oxygen storage means positioned within and surrounded by said cushioning material, said oxygen storage means comprising a length of flexible, non-expansible pipe of small diameter, said pipe being spirally coiled in a plane approximately parallel to a seating surface of said cushion, one end of the pipe being closed and the other end thereof connected to a valve fitting, said valve fitting extending to the outside of said cushion and adapted to be attached to a breather tube whereby oxygen may be supplied to a user.

STERLING W. ALDERFER.